US012145277B2

(12) United States Patent
Lin et al.

(10) Patent No.: US 12,145,277 B2
(45) Date of Patent: Nov. 19, 2024

(54) FRAMEWORK OF ROBOTIC ONLINE MOTION PLANNING

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 611 days.

(21) Appl. No.: 17/011,428

(22) Filed: Sep. 3, 2020

(65) Prior Publication Data

US 2022/0063099 A1 Mar. 3, 2022

(51) Int. Cl.
*B25J 9/16* (2006.01)
*B25J 19/02* (2006.01)

(52) U.S. Cl.
CPC ........... *B25J 9/1666* (2013.01); *B25J 9/1612* (2013.01); *B25J 9/1687* (2013.01); *B25J 19/02* (2013.01)

(58) Field of Classification Search
CPC ...... B25J 9/1666; B25J 9/1612; B25J 9/1687; B25J 19/02; B25J 9/1664; B25J 9/1697; G05B 2219/40425; G05B 2219/40428; G05B 2219/40431; G05B 2219/40476; G05B 2219/40517; G05D 1/0246; G05D 2201/0217

See application file for complete search history.

(56) References Cited

U.S. PATENT DOCUMENTS

2010/0305753 A1* 12/2010 Weiss ................. G05B 19/4103
700/245
2015/0100194 A1* 4/2015 Terada ................. G05D 1/0214
701/25

(Continued)

FOREIGN PATENT DOCUMENTS

WO 20200040979 A1 2/2020

OTHER PUBLICATIONS

Geraerts, Roland, and Mark H. Overmars. "Creating high-quality paths for motion planning." The International Journal of Robotics Research, vol. 26, No. 8, 2007, pp. 845-863 (Year: 2007).*

*Primary Examiner* — Adam R Mott
*Assistant Examiner* — Elizabeth Rose Neleski
(74) *Attorney, Agent, or Firm* — John A. Miller; Shumaker, Loop & Kendrick, LLP

(57) ABSTRACT

A robot motion planning technique using an external computer communicating with a robot controller. A camera or sensor system provides input scene information including start and goal points and obstacle data to the computer. The computer plans a robot tool motion based on the start and goal points and the obstacle environment, where the robot motion is planned using either a serial or parallel combination of sampling-based and optimization-based planning algorithms. In the serial combination, the sampling method first finds a feasible path, and the optimization method then improves the path quality. In the parallel combination, both sampling and optimization methods are used, and a path is selected based on computation time, path quality and other factors. The computer converts dense planned waypoints to sparse command points for transfer to the robot controller, and the controller computes robot kinematics and interpolation points and controls the movement of the robot.

19 Claims, 6 Drawing Sheets

(56) References Cited

U.S. PATENT DOCUMENTS

| | | | | |
|---|---|---|---|---|
| 2019/0275675 A1* | 9/2019 | Seno | ............... | G05B 19/02 |
| 2020/0030977 A1* | 1/2020 | Diankov | ............ | G05B 19/4182 |
| 2021/0178591 A1* | 6/2021 | Floyd-Jones | .......... | B25J 9/1671 |
| 2021/0221386 A1* | 7/2021 | Quirynen | ............... | G05B 17/02 |

* cited by examiner

FRAMEWORK OF ROBOTIC ONLINE MOTION PLANNING

BACKGROUND

Field

The present disclosure relates generally to the field of industrial robot motion control and, more particularly, to a robot motion planning technique which uses a computer separate from a robot controller to plan a robot motion based on start and goal points and an obstacle environment, where the robot motion is planned using either a serial or parallel combination of sampling-based and optimization-based planning algorithms, and converts dense planned waypoints to sparse command points for transfer to the robot controller.

Discussion of the Related Art

The use of industrial robots to perform a wide range of manufacturing, assembly and material movement operations is well known. In some robotic applications, the start and/or goal point location changes for every robot task. This is the case, for example, when the robot's task is picking up a part from an inbound conveyor and placing the part in an open location in a shipping container. In these applications, a new robot motion path must be computed for each task in real time. Furthermore, in many robot workspace environments, obstacles are present and may be located in the path of the robot's motion. The obstacles may be permanent structures such as machines and fixtures, or the obstacles may be temporary or mobile. Collisions between the robot and any obstacle must absolutely be avoided.

Various techniques are known in the art for planning robot tool path motions based on the start and goal points and the obstacle environment. One commonly-used technique is a sampling-based method where random sample waypoints are defined and a tree of collision-free waypoints is grown until the start point is connected to the goal point. Another known technique is an optimization-based method where waypoints along a path from the start point to the goal point are iteratively adjusted based on optimization objective and constraint functions until the path is collision-free. Other techniques also exist, including variations of the sampling-based method.

A recent trend in robotic motion planning is to perform the motion planning calculations on a computer which is separate from the robot controller. Systems of this type are known which perform sampling-based motion planning to find a collision-free path, then compute interpolation points to produce a robot tool trajectory, and finally transfer the trajectory to the robot controller for execution by the robot. However, these systems create intensive communication bandwidth demands, fail to take advantage of the robot motion planning computation features of the robot controller, and may not provide path plans of a desired quality.

In light of the circumstances described above, there is a need for a robot motion planning technique which provides high quality path plans, is fast enough to run in real time during robot operations, and takes advantage of the inherent motion computing capabilities of the robot controller.

SUMMARY

In accordance with the teachings of the present disclosure, a robot motion planning technique using an external computer communicating with a robot controller is disclosed. A camera or sensor system provides input scene information including start and goal points and obstacle data to the external computer. The computer plans a robot tool motion based on the start and goal points and the obstacle environment, where the robot motion is planned using either a serial or parallel combination of sampling-based and optimization-based planning algorithms. In the serial combination, the sampling method first finds a feasible path, and the optimization method then improves the path quality. In the parallel combination, both sampling and optimization methods are used, and a path is selected based on computation time, path quality and other factors. The computer converts dense planned waypoints to sparse path points for transfer to the robot controller, and the controller then computes robot kinematics and interpolation points and uses these to control the movement of the robot.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a robot motion planning technique using a combination of optimization and sampling methods and path function fitting is merely exemplary in nature, and is in no way intended to limit the disclosed devices and techniques or their applications or uses.

It is well known to use industrial robots for a variety of manufacturing, assembly and material movement operations. In some types of these operations, the robot must be programmed to move along a path having a start point and/or a destination (goal) point which are different from one operation to the next. For example, in a move, pick and place operation, inbound parts on a conveyor may be picked up by the robot at a different location each time, and parts placed by the robot in a shipping container will each be placed in a different assigned position within the container. Alternately, parts may be picked by the robot from a bin full of parts, and then placed on an outbound conveyor. Many other example applications exist where a new path must be computed for each individual task or operation of the robot.

Furthermore, in many robot workspace environments, obstacles are present and may be in the path of the robot's motion—that is, one or more obstacles may be located between the start and goal points, or stated more generally, between a robot's current position and the robot's destination position. The obstacles may be permanent structures such as machines and fixtures, or the obstacles may be temporary or mobile.

Figure 1:
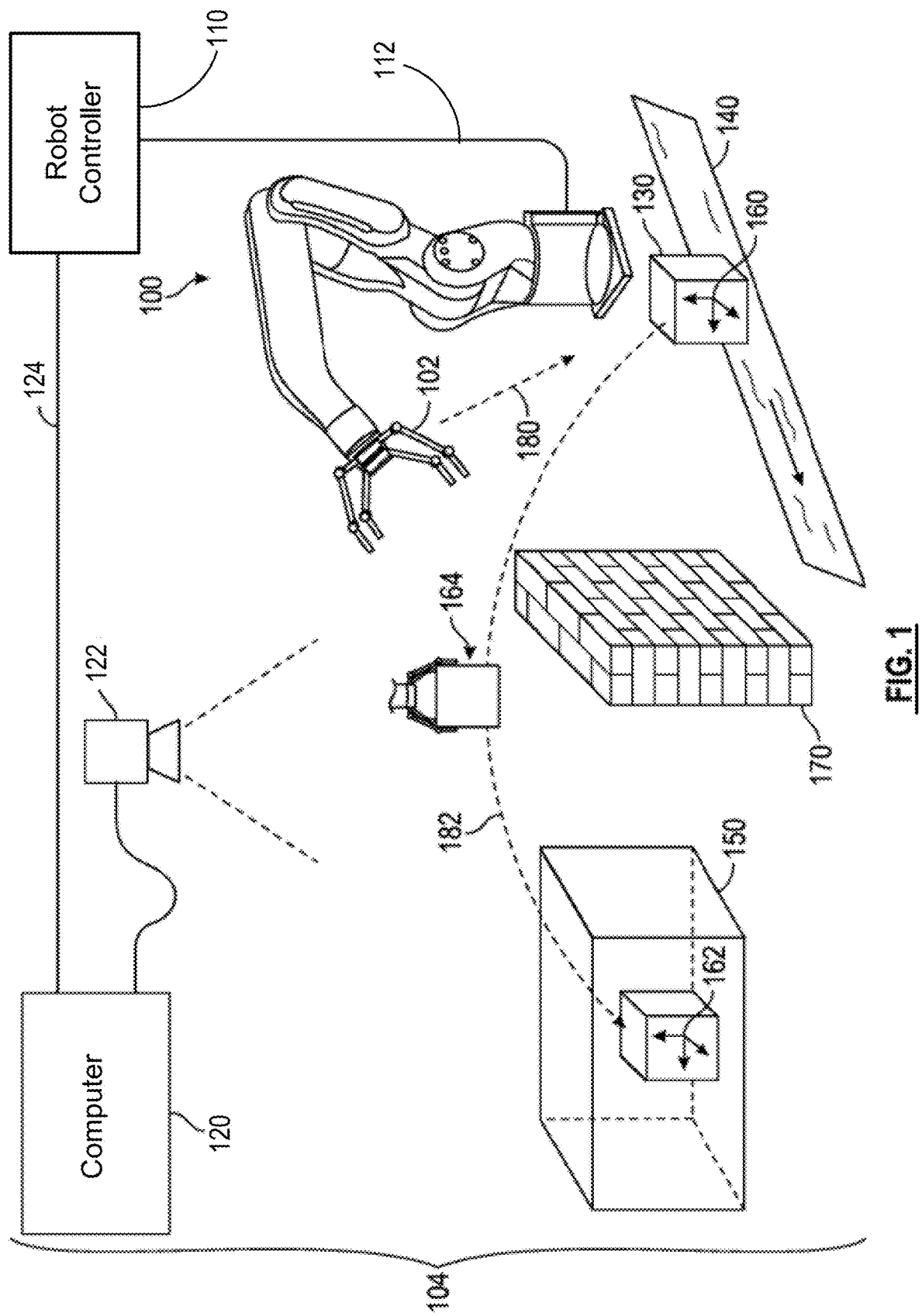
FIG. 1 is an illustration of an industrial robot performing a pick, move and place operation, where a new path must be computed for each workpiece being moved, and the workspace environment includes one or more obstacles to be avoided.

FIG. 1 is an illustration of an industrial robot performing a pick, move and place operation in a scenario of the type described above, where a new path must be computed for each workpiece being moved, and the workspace environment includes one or more obstacles to be avoided. A robot 100 having a gripper 102 operates within a workspace 104. Motion of the robot 100 is controlled by a controller 110, which typically communicates with the robot 100 via a cable 112. The controller 110 provides joint motion commands to the robot 100 and receives joint position data from encoders in the joints of the robot 100, as known in the art. The controller 110 also provides commands to control operation of the gripper 102. The pick, move and place scenario of FIG. 1 is merely illustrative and exemplary. The optimization motion planning techniques of the present disclosure are applicable to any type of robot operation, and the gripper 102 may be replaced by any type of robot tool.

A computer 120 is used to compute a robot tool path in a manner to be discussed below. A camera 122 communicates with the computer 120 and provides images of the workspace 104. Images from the camera 122 may be used to identify the position and orientation of workpieces to be operated on by the robot 100, and/or locations where a workpiece is to be placed by the robot 100, and even to identify moving or transient obstacles in the workspace 104. It is to be understood that the camera 122 may be replaced by or augmented by any other type of sensor suitable for identifying start and goal points (positions and orientations) of workpieces.

A workpiece 130 is inbound into the workspace 104 on a conveyor 140. The task of the robot 100 is to pick up the workpiece 130 from the conveyor 140, move the workpiece 130 and place it in a container 150 (such as a shipping container). A position and orientation of a start point 160 are defined based on information about the position of the workpiece 130 on the conveyor 140 and the speed of the conveyor 140. Orientation of the workpiece 130 at the start point 160 is needed in order to determine an orientation for the gripper 102. Similarly, a position and orientation of a goal point 162 are defined based on information about the next available compartment or location within the container 150. One intermediate point 164 is illustrated in FIG. 1, partway between the start point 160 and the goal point 162. In actual robot motion planning computations, multiple intermediate path points are calculated in order to satisfy all path constraints, and a smooth tool path is computed which passes through the plurality of path points. Again, this is just one example of variable start and goal positions; many other examples may be envisioned. For example, the operation could be reversed—where the workpiece 130 is picked from a bin full of parts and placed in a certain pose on the conveyor 140.

An obstacle 170—shown as a wall—exists between the start point 160 and the goal point 162. It can also be appreciated that the sides of the container 150 represent obstacles which must be avoided by the robot 100 and considered in path planning. Other obstacles may also exist.

For each workpiece 130 arriving on the conveyor 140, a new path must be computed by the computer 120 and the controller 110 which causes the robot 100 to move the gripper 102 from a home or approach position along a path segment 180 to pick up the workpiece 130 at the start point 160, and move the workpiece 130 along a path 182 to the goal point 162 while avoiding the obstacle 170, then return the gripper 102 to the home or approach position in preparation for the next workpiece 130. The new path must be computed by the computer 120 and the controller 110 very quickly, because the path computation must be performed in real time as fast as the robot 110 can move one workpiece 130 and return to pick up the next.

Figure 2:
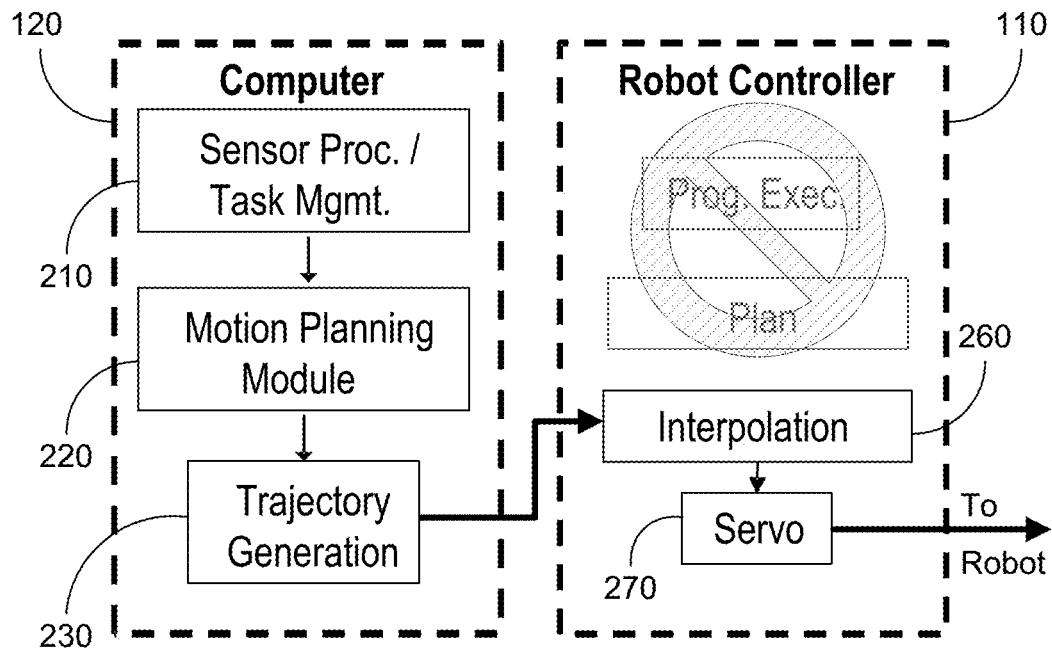
FIG. 2 is a block diagram of a known prior art system for robotic motion path planning using an external computer in communication with a robot controller.

FIG. 2 is a block diagram of a known prior art system for robotic motion path planning using the computer 120 in communication with the robot controller 110. A sensor processing and task management module 210 receives images from the camera 122 or data from another type of sensor in order to provide a depiction of an input scene. In simple terms, the module 210 determines the start and goal points for the upcoming robot task, and it does this by identifying an incoming part on a conveyor or a particular part to pick out of a bin, and a corresponding destination location and pose (on a conveyor or in a container for example). The location of obstacles in the workspace may also be provided by the module 210, especially if any moving obstacles are present or possible.

A motion planning module 220 computes a tool path based on the data from the module 210. Various techniques are known in the art for planning robot tool path motions based on the start and goal points and the obstacle environment. One commonly-used technique is a sampling-based method where random sample waypoints are defined and evaluated, and a tree of collision-free waypoints is grown until the start point is connected to the goal point. One specific sampling-based technique is known as the rapidly-exploring random tree (RRT) method. RRT rapidly and randomly builds a space-filling tree of nodes until it finds a collision-free path from an initial configuration to a final configuration. Given surface/solid or point cloud data representing the obstacles, and the initial and final workpiece configurations (start and goal position and pose), RRT can be used to find a motion sequence if one exists. Each node in RRT motion planning must be evaluated and determined to be collision-free in order to be included as a valid or feasible waypoint. Also, because each candidate waypoint is randomly placed, RRT will find a different solution every time, even when the initial conditions and boundary conditions are identical. Furthermore, RRT-defined paths are inherently crooked (zig-zag shape), as the "best" candidate waypoint at each step is usually somewhat off course from the ideal direction. Thus, RRT-based techniques for motion planning have been found to be inefficient in some applications.

A trajectory generation module 230 receives the tool path motion plan from the motion planning module 220 and computes a complete trajectory. In the prior art system of FIG. 2, the trajectory generation module 230 computes all trajectory interpolation points, creating a dense series of points for robot tool motion. The trajectory interpolation points are then transferred from the computer 120 to the robot controller 110 and received by an interpolation module 260. Because the trajectory interpolation points have already been computed by the trajectory generation module 230 on the computer 120, the interpolation module 260 on the controller 110 merely receives the trajectory interpolation points and passes them to a servo motor control module 270 which drives the joint motors in the robot 100 in a known fashion.

Systems of the type shown in FIG. 2 have been demonstrated to work. However, these systems have several disadvantages. The system of FIG. 2 bypasses many software functions in the robot controller 110, which places extra computational burden on the computer 120 while underutilizing the controller 110. The bypassing of computational features of the controller 110 may also cause the robot motion to be slower and less smooth than if the controller 110 had been allowed to perform more of the kinematics and interpolation calculations itself. Also, additional burden is also placed on data exchange (real-time data streaming of a large number of points in every interpolation period); any data packet loss may cause discontinuity of the robot motion. Finally, the prior art system of FIG. 2 typically relies on the sampling-based motion planning, with the shortcoming that it generates unnecessary zig-zag motions and random motion patterns.

The present disclosure describes a system and methods which overcome the several shortcomings of prior art systems. These techniques are discussed in detail below.

Figure 3:
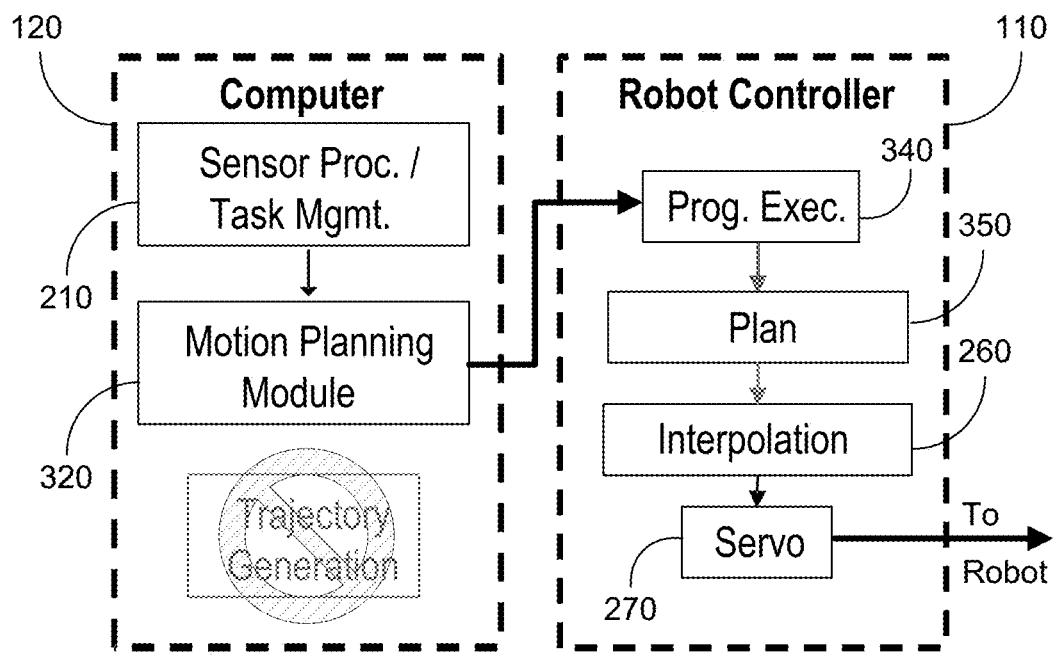
FIG. 3 is a block diagram of a system for robotic motion path planning using an external computer in communication with a robot controller, according to an embodiment of the present disclosure.

FIG. 3 is a block diagram of a system for robotic motion path planning using an external computer in communication with a robot controller, according to an embodiment of the present disclosure. The system of FIG. 3 uses the computer 120 in communication with the controller 110, as shown in FIG. 1. However, the system of FIG. 3 includes different programming configurations in both the computer 120 and the controller 110 than the system of FIG. 2. Specifically, the computer 120 is configured to plan the best quality path possible within the allotted cycle time, and the controller 110 uses all of its functionality for computing robot kinematics and interpolation points to provide smooth and expedient tool motion.

In FIG. 3, the sensor processing and task management module 210 operates as described above relative to FIG. 2. That is, the module 210 receives camera images or sensor data, and provides the start and goal points for the upcoming robot task, along with obstacle data. The start and goal points and the obstacle data are provided to a motion planning module 320. The motion planning module 320 in FIG. 3 is much different than the motion planning module 220 of FIG. 2. Details of the motion planning module 320 are discussed below with respect to FIGS. 4, 5 and 6.

The motion planning module 320 provides a sparse sequence of planned path points to a top-level program execution module 340 on the robot controller 110. The program execution module 340 handles high-level functions such as operating system interaction, user interface, data interface, and control of other software modules. The program execution module 340 provides the sparse planned path points to a planning module 350. The planning module 350 performs several functions, including interpreting the sparse planned path points, and determining a type of inverse kinematics calculation to use (all joints computed concurrently, or first three joints computed independently of last three joints, etc.). The planning module 350 also defines trigger points for robot-attached tools—such as a grasp or release command for a gripper, or a torch on/off commands for a welding operation.

The planning module 350 provides robot motion and control commands to the interpolation module 260, which is the same as the like-numbered module of FIG. 2. In this case, however, the interpolation module 260 adds interpolation points to define a complete set of motion commands to the servo motor control module 270, which drives the joint motors in the robot 100 as discussed earlier.

By providing the sparse sequence of points from the computer 120 to the program execution module 340, all of the inherent capabilities of the robot controller 110 can be utilized—thereby providing robot kinematics calculations, interpolation points and motion commands which allow the robot 100 to move smoothly and without hesitation along the path computed by the motion planning module 320.

Figure 4:
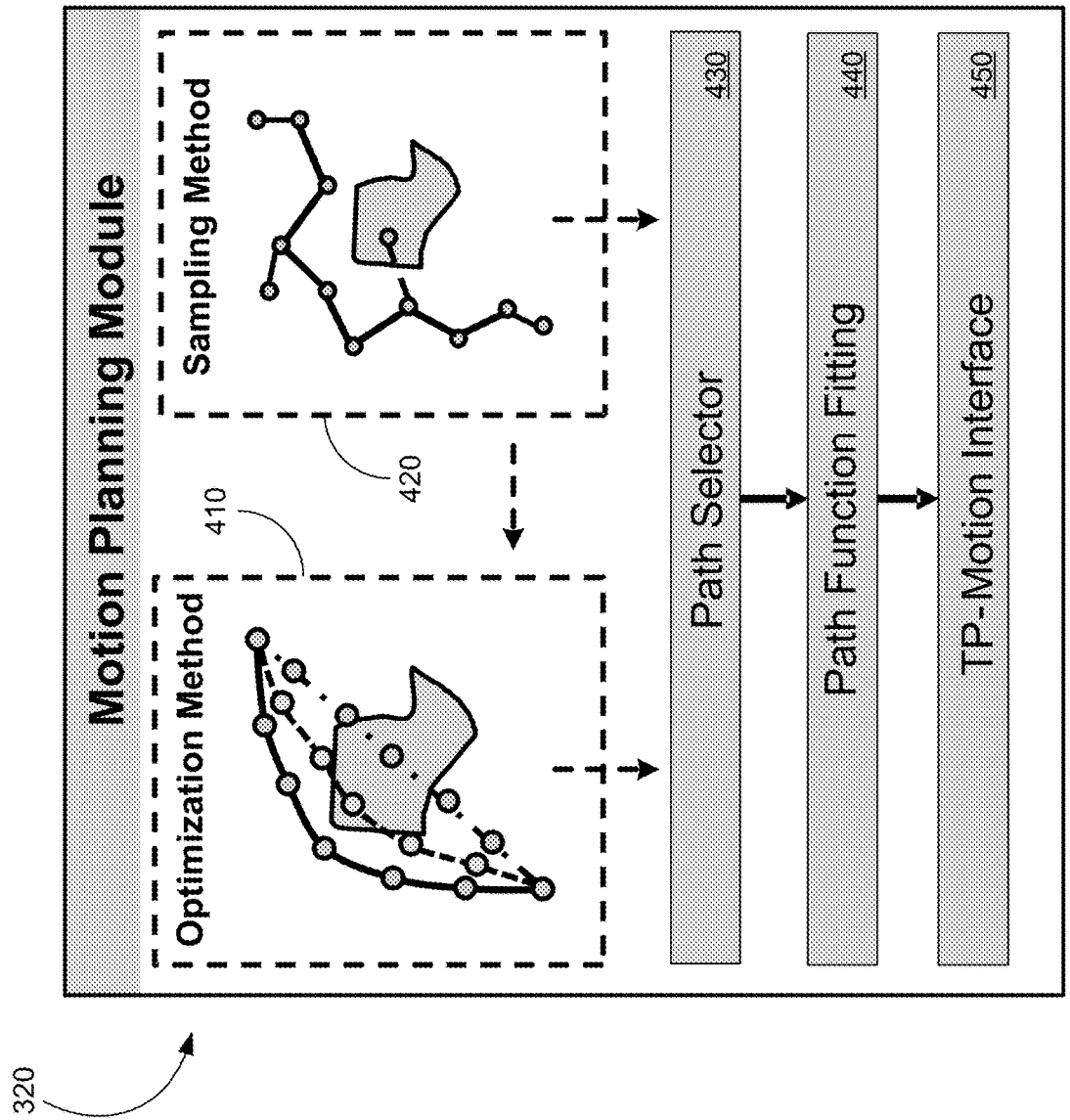
FIG. 4 is a block diagram of a motion planning module of the system of FIG. 3, the module using a combination of optimization and sampling motion planning methods, according to an embodiment of the present disclosure.

FIG. 4 is a block diagram of the motion planning module 320 of the system of FIG. 3, where the module 320 uses a combination of optimization and sampling motion planning methods, according to an embodiment of the present disclosure. As discussed above, the motion planning module 320 is software which runs on the computer 120 and receives the start and goal points and the obstacle environment data from the sensor module 210.

The motion planning module 320 includes both an optimization method calculation module 410 and a sampling method calculation module 420. Both the optimization module 410 and the sampling module 420 receive the start and goal points and obstacle data, and the modules 410 and 420 may operate independently. The optimization method calculation module 410 starts with an initial reference path, which may be a straight line from the start to goal point or some other initial reference (discussed below), and runs an optimization routine including an objective function and constraint functions. The optimization routine continues iterative calculations until the constraints are met and the objective function is minimized—resulting in a collision-free path of minimum length and maximum path quality (smoothness, curvature, etc.). The sampling method calculation module 420 performs random tree growth planning in the manner discussed previously until a collision-free path is found from the start point to the goal point. Outputs from the optimization module 410 and the sampling module 420 may be used and combined in several different ways, as indicated by the dashed arrows on FIG. 4 and as described below.

Although the diagrams shown in FIG. 4 are two-dimensional, it is to be understood that all of the calculations performed in the presently disclosed techniques are three-dimensional and include all six degrees of freedom (DOF) of an item where applicable. The start and goal points include position (three coordinates) and pose (three angular orientations). The obstacles are defined as three-dimensional objects, either in terms of surface or solid models from CAD, or by point cloud or surface data from the sensor module 120. The computed tool paths are in three-dimensional space, and include not only the tool center point location but also the orientation (six DOF). In addition, collision avoidance calculations are performed not just between the robot tool and the obstacles, but between all parts/arms of the robot and the obstacles.

The motion planning module 320 includes a path selector module 430 which, for each cycle of the robot, selects a best path to be used, based on candidate planned paths from the optimization module 410 and/or the sampling module 420. The path selector module 430 may be configured in one of two different ways—serial combination or parallel combination of the optimization and sampling paths. These two configurations of the path selector module 430 (identified as 430A and 430 B, respectively) are discussed below with reference to FIGS. 5 and 6. By using a combination of optimization and sampling algorithms, the path selector module 430 can utilize the strengths of both methods—and avoid the weaknesses of each method—in order to obtain the best possible planned tool path.

The path selector module 430 provides a planned tool path to a path function fitting module 440. The planned tool path from the path selector module 430 includes a fairly dense sequence of waypoints; this is required in order to ensure that there is no collision in between waypoints. The path function fitting module 440 converts the dense sequence of waypoints into a sparse sequence of command points for transfer to the robot controller 110. The sparse sequence of points provided by the path function fitting module 440 is computed in a way that the robot controller can calculate the interpolation points so that they match the original dense sequence of waypoints from the path selector module 430. The path function fitting module 440 (discussed below) provides the sparse sequence of command points to a tool path motion interface module 450, which transfers the sparse command points to the top-level program execution module 340 on the robot controller 110 as discussed earlier.

Figure 5:
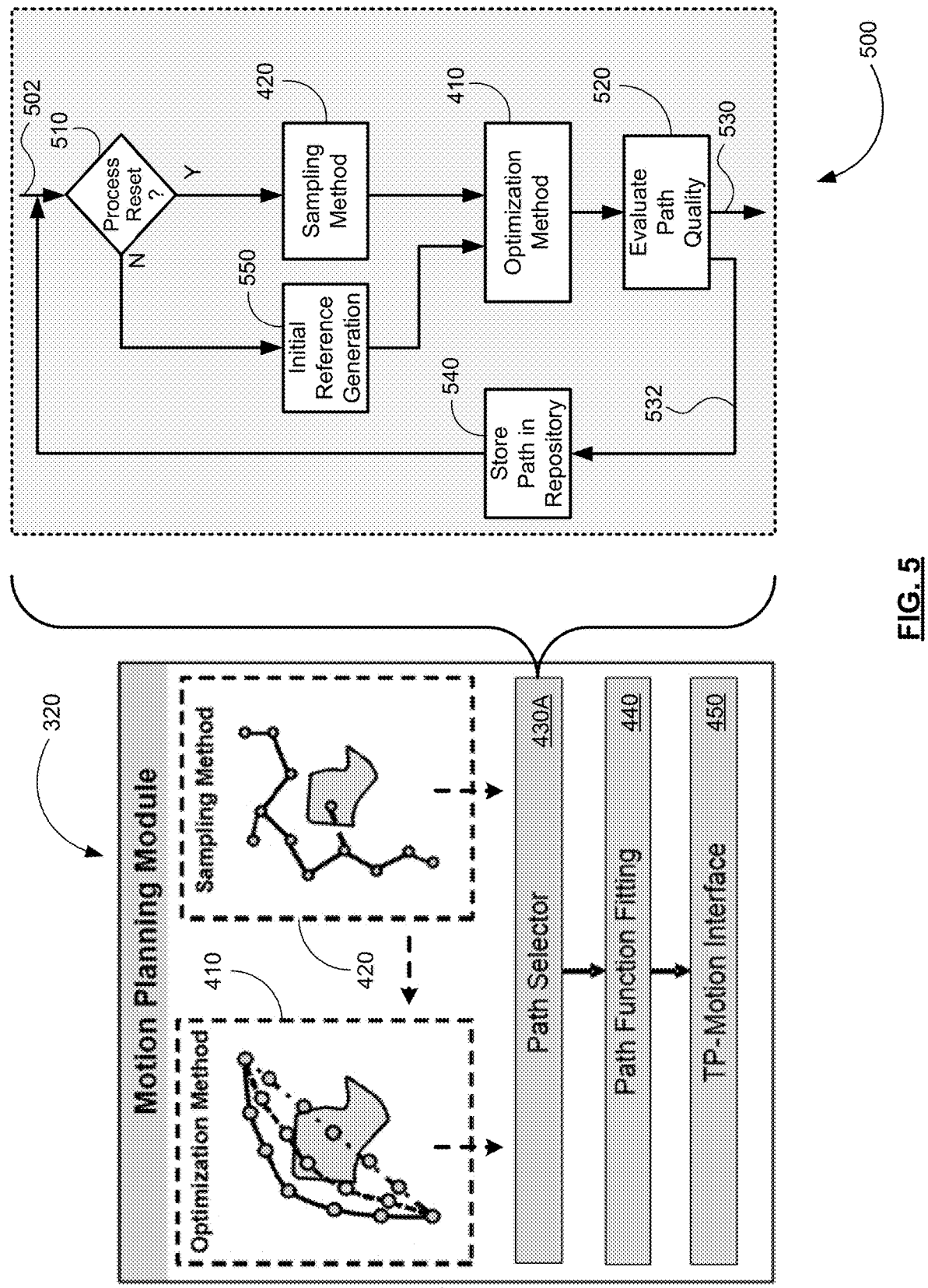
FIG. 5 is a flowchart diagram of a method for path selection using a serial combination of sampling and optimization motion planning in the motion planning module of FIG. 4, according to an embodiment of the present disclosure.

FIG. 5 is a flowchart diagram of a method 500 for path selection using a serial combination of sampling and optimization motion planning in the motion planning module of FIG. 4, according to an embodiment of the present disclosure. The block diagram of the motion planning module 320 (from FIG. 4) is shown at the left of FIG. 5 for reference. The flowchart diagram 500 represents one embodiment (serial combination) of a path selector, which is encoded in the path selector module 430A of the motion planning module 320.

A cycle of robot motion includes the robot picking up a workpiece at the start point and pose, moving the workpiece to and placing it at the goal point and pose, and returning to a ready position to pick up another workpiece. Calculations in the motion planning module 320, and hence the flowchart diagram 500, are performed for each cycle of robot motion.

On input line 502, data for a current robot cycle (or task) is received from the camera or sensor module 210. The data includes the start and goal points and poses for the part movement, and obstacle data. The process then branches based on whether the current robot task is expected to have a similar motion pattern to the previous task (only slightly different start and/or goal points). At decision diamond 510, it is determined whether a process reset has occurred. A process reset could be an event such as providing a new bin of parts to be picked (which would result in a much different start point than the previous part), or a new shipping container in which parts are to be placed (which would result in a much different goal point than the previous part). Any change in the obstacle data—such as a mobile obstacle entering the workspace which could affect the allowable robot tool movement—would also constitute a process reset. The first time through the process of the flowchart diagram 500, the process reset answer is also yes.

If the process reset answer is yes at the decision diamond 510, which means that the current robot task might not have a very similar motion to the previous task, then the process moves to the sampling method box 420. At the sampling method box 420, a collision-free path is computed from the start point to the goal point using a sampling method such as RRT. As discussed earlier, the sampling method may compute a path that includes undesirable characteristics such as zig-zag shapes. The serial combination method of FIG. 5 therefore adds a subsequent optimization path planning step, using the results of the sampling path planning as input, in order to improve the shape of the planned path.

The optimization method box 410 receives the preliminary path computed by the sampling method box 420, along with the start and goal points and obstacle data, and uses the preliminary path as an initial reference for the optimization calculations. The optimization method performs an iterative optimization calculation, including an objective function and constraint functions, to find a collision-free path from the start point to the goal point having optimal path quality characteristics. The iterative calculation requires an initial reference path, which is used in the first iteration. The initial reference path could be a naïve straight line from the start point to the goal point, but this may result in excessive optimization computation times, or may not even lead to a solution. The sampling-based preliminary path provides a very good initial reference for the optimization method calculations, because the sampling-based path is collision-free and has the correct start and goal points. The optimization method calculations at the box 410 improve the path quality by removing any undesirable movements and zig-zag shapes.

At box 520, the quality of the path from the optimization method box 410 is evaluated. The quality may be determined as a combination of tool path travel distance, path curvature, path execution time, smoothness of the path, and/or other factors. This path quality should ordinarily be very good as it is the result of an optimization calculation which inherently provides smooth and well-shaped paths because the objective function typically includes these parameters. Only if the optimization calculation ran out of time and did not converge, and the sampling-based preliminary path was provided to the box 520, would insufficient path quality be likely encountered. If path quality is insufficient at the box 520 (lacks smoothness, includes jerky motions), then a system fault is declared and no part is picked by the robot.

If path quality is sufficient at the box 520, then the path from the optimization method box 410 is provided on output line 530. When a planned path is provided on the output line 530, the planned path is sent to the path fitting function module 440 (mentioned above and discussed further below), and a final sparse set of command points are provided to the tool path motion interface module 450, which transfers the sparse command points to the robot controller 110.

From the box 520, when the planned path is output on the line 530, the process also loops back on line 532 to begin computations for the next robot cycle. At box 540, the path which was just output on the line 530 is stored in a data repository for later use in initial reference path generation, as discussed below. The process then returns to the top of the flowchart, to the input line 502.

After the robot executes the pick motion for the path which was just planned, new scene data is provided on the input line 502 from the camera/sensor module 210. If there has been no significant reset of the process (such as a new bin of input parts, or a new output shipping container, or a new obstacle), then at the decision diamond 510 the answer is no. The process then moves to box 550 for initial reference generation. Initial reference generation involves providing an initial reference path for the optimization motion calculations, where the initial reference path is based on the shape of a previously planned path adjusted (scaled and shifted) to match the start and goal points of the path currently being calculated. A technique for initial reference generation suitable for use in the box 550 was described in U.S. patent application Ser. No. 16/839,720, titled "INITIAL REFERENCE GENERATION FOR ROBOT OPTIMIZATION MOTION PLANNING", filed Apr. 3, 2020 and commonly assigned to the present application; the Ser. No. 16/839,720 application is hereby incorporated by reference in its entirety.

Because the path currently being computed is very similar to a previously computed path (same obstacle environment, and similar start and goal points), the initial reference generation at the box 550 will be able to quickly provide an initial reference path which is a very good approximation of the path currently being computed. This in turn allows the optimization method box 410 to quickly converge on an optimized path and provide that planned path to the box 520. The process continues in this manner, with each planned path output on the line 530 and executed by the robot, followed by a loop back to store the planned path, then receive new input scene data and compute a new path.

The serial combination of sampling-based and optimization-based motion planning, described above, provides a unique set of advantages in computing robot motions. Another approach, employing a parallel combination of sampling-based and optimization-based, is discussed below.

Figure 6:
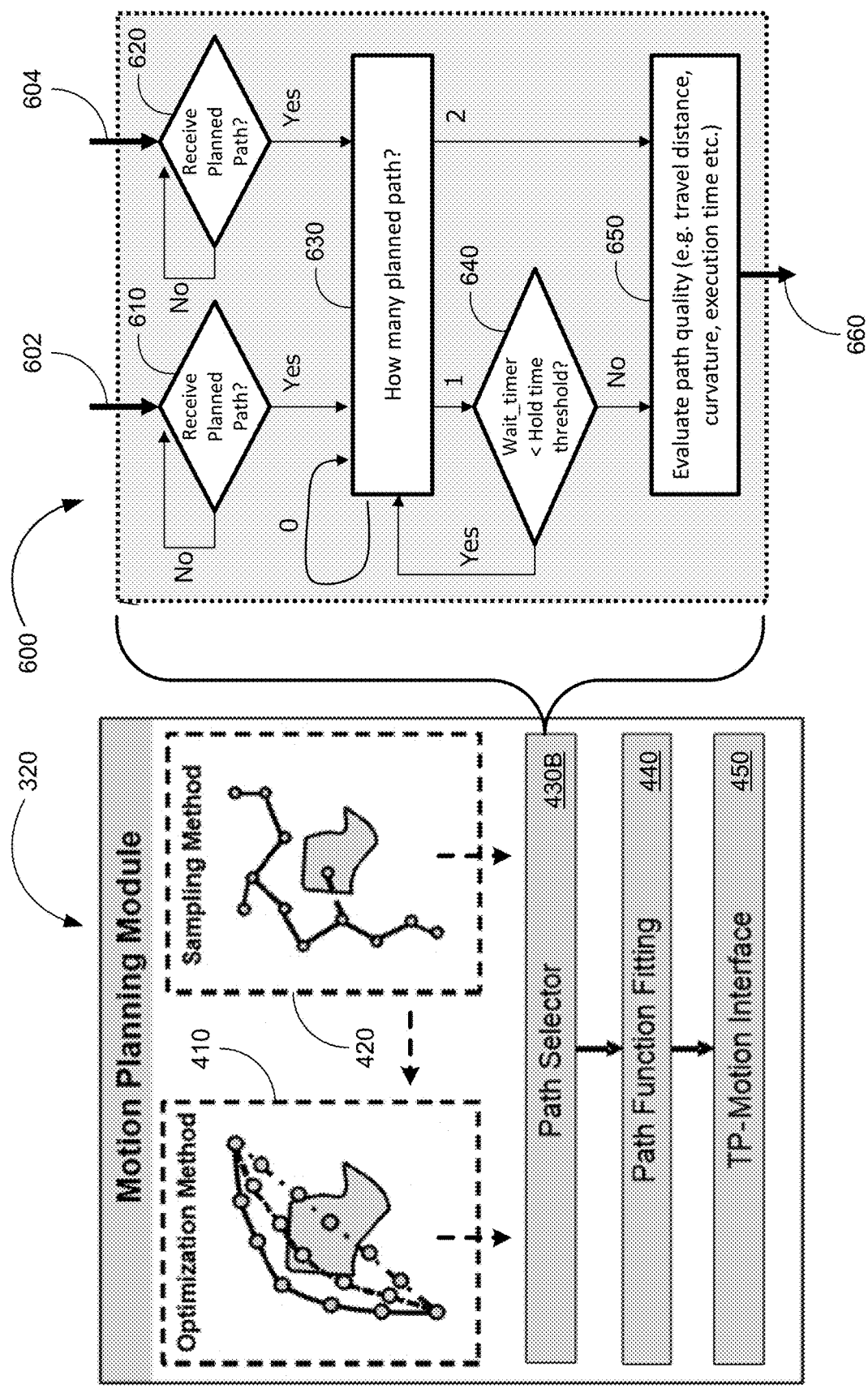
FIG. 6 is a flowchart diagram of a method for path selection using a parallel combination of sampling and optimization motion planning in the motion planning module of FIG. 4, according to an embodiment of the present disclosure.

FIG. 6 is a flowchart diagram of a method for path selection using a parallel combination of sampling and optimization motion planning in the motion planning module of FIG. 4, according to an embodiment of the present disclosure. The block diagram of the motion planning module 320 (from FIG. 4) is again shown at the left of FIG. 6 for reference. The flowchart diagram 600 represents one embodiment (parallel combination) of a path selector, which is encoded in the path selector module 430B of the motion planning module 320. As before, the calculations in the motion planning module 320, and hence the flowchart diagram 600, are performed for each cycle or task of robot motion.

On input lines 602 and 604, candidate planned paths are received from the optimization module 410 and the sampling module 420. The optimization module 410 and the sampling module 420 each independently compute a candidate path based on the data from the camera or sensor module 210 (start and goal points, and obstacle data). The optimization module 410 may provide input on the line 602 and the sampling module 420 input on the line 604, or vice versa. At decision diamonds 610 and 620, it is determined whether a candidate planned path has been received on the respective input line. If not, the decision diamonds continue to wait/loop until a candidate path is received. When a candidate path is received at either the decision diamond 610 or 620, the path is passed on to box 630. At the box 630, the number of candidate paths received is evaluated periodically. If two candidate paths have been received (one each from the optimization module 410 and the sampling module 420), then the two candidate paths are passed on from the box 630 to a box 650.

At the box 650, the quality of the candidate paths is evaluated to select one path to use. The quality may be determined as a combination of robot joint path travel distance, path curvature, path execution time, smoothness of the path, and/or other factors. The path with the highest quality score is selected and output on line 660, where is it is provided to the path function fitting module 440 and ultimately transferred to the robot controller 110 and executed by the robot 100.

At the box 630, if only one candidate path has been received (from either the optimization module 410 or the sampling module 420), then the candidate path is passed on from the box 630 to a decision diamond 640. At the decision diamond 640, it is determined if a wait time threshold has been exceeded. The wait time threshold is predefined based on the cycle time of the robot; that is, based on the ideal cycle time of the robot, the maximum permissible time to wait at the decision diamond 640 can be determined. If the wait time threshold has not been exceeded, the process loops back from the decision diamond 640 to the box 630 to periodically check again how many candidate paths have been received. Either a second candidate path will be received and both paths provided to the box 650, or the wait time threshold will eventually be reached at the decision diamond 640, leading to a single candidate path being provided to the box 650.

If the decision diamond reaches the wait time threshold and only a single candidate path is provided to the box 650, then the box 650 no longer performs a comparison of one candidate path's quality against the other. In this case, the box 650 evaluates the quality of the single candidate path, based on the same criteria discussed above. If the quality of the path is suitable, then the path is provided on the output line 660. If the quality of the path is unsuitable (for example, an extreme zig-zag shape, or an excessively great path length), then no path may be provided on the output line 660, and a system fault declared (no part picked on the current cycle).

When a planned path is provided on the output line 660, the path is sent to the path fitting function module 440 (mentioned above and discussed further below), and a final sparse set of command points are provided to the tool path motion interface module 450, which transfers the sparse command points to the robot controller 110. The process begins again at the top of the flowchart diagram 600 for the next cycle of the robot, with sensor data provided to the optimization module 410 and the sampling module 420 which provide their computed candidate paths, when ready, on the input lines 602 and 604.

Returning to the motion planning module 320 of FIG. 4, two embodiments of the path selector module 430 have been discussed above—the serial combination module 430A and the parallel combination module 430B. In either case, a path of suitable quality is provided to the path function fitting module 440, which is described below.

Figure 7:
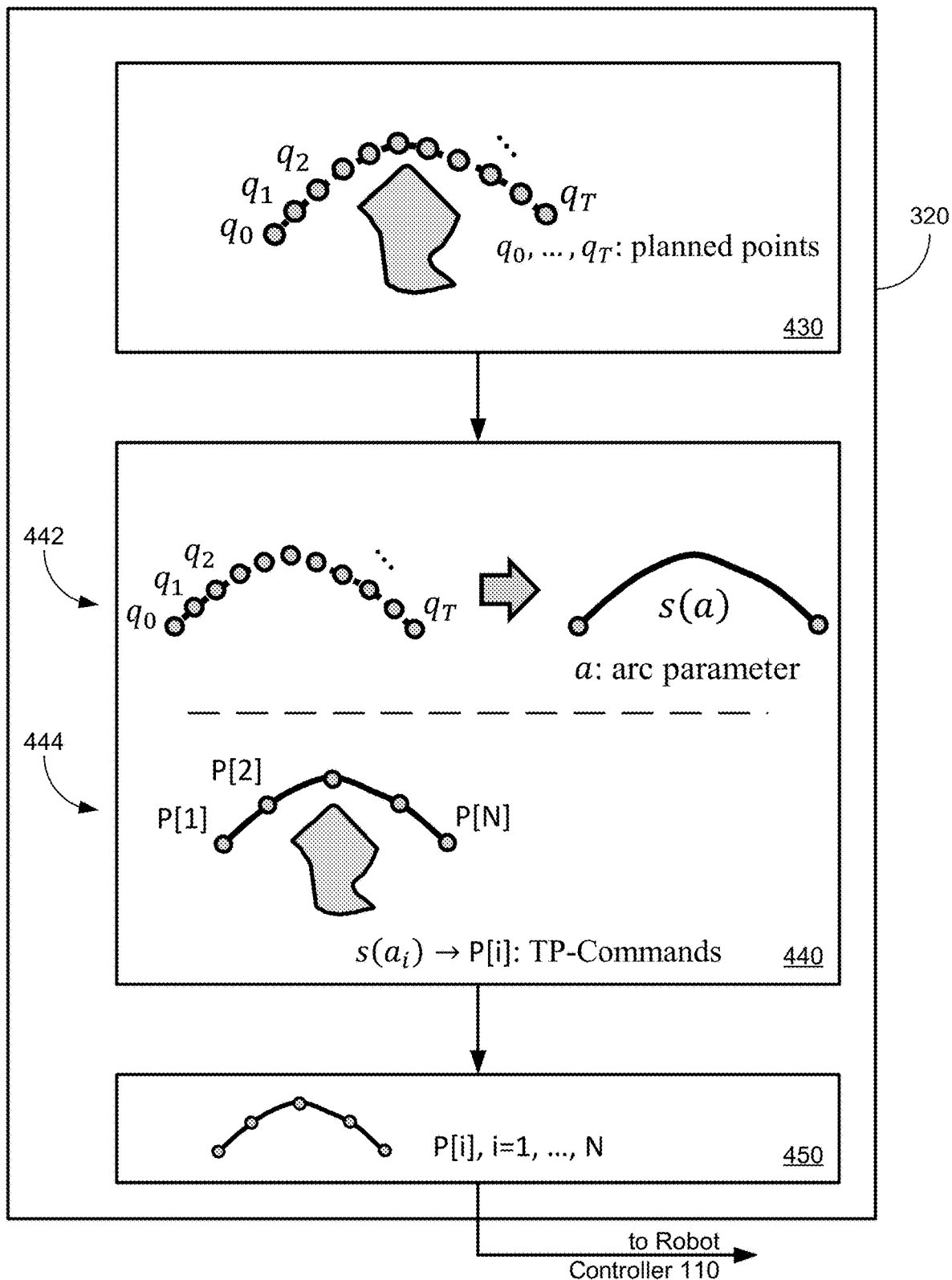
FIG. 7 is an illustrated block diagram of a path function fitting module used in the motion planning module of FIG. 4, according to an embodiment of the present disclosure.

FIG. 7 is an illustrated block diagram 700 of the path function fitting module 440 used in the motion planning module 320 of FIG. 4, according to an embodiment of the present disclosure. The purpose of the path fitting function module 440 is to provide a sparse set of command points for the planned path, to be provided to the robot controller 110.

In the path selector module 430, a path is planned for the current robot task, such as moving a part from a start point to a goal point while avoiding any collision with an obstacle. The path planning could be done using the path selector module 430A (serial combination of sampling and optimization methods) or the path selector module 430B (parallel combination of sampling and optimization methods), as described in detail above.

The path selector module 430 provides a dense sequence of waypoints, as is required to ensure that the entire path is collision-free. This is because, if the planned waypoints were sparsely spaced, a collision could exist between the waypoints and be undetected. It is not desired to send the dense sequence of waypoints to the robot controller 110, for the reasons discussed earlier—including communication bandwidth requirements, and the desire to allow the robot controller 110 to compute robot kinematics and interpolation points.

The first calculation in the path function fitting module 440, shown at 442, is to compute a spline function s based on the planned path points ($q_0, \ldots, q_T$). The spline function s may be computed using any suitable technique, such as fitting the planned path points with a series of piecewise cubic polynomials. The spline function s is represented as a continuous entity having an arc length parameter a representing the distance along the spline s. That is, $a=0$ at the start point $q_0$, and $a=1$ at the goal point $q_T$.

The next calculation in the path function fitting module 440, shown at 444, is to compute the sparse set of path points from the spline s. Based on the nature of the robot task and path, a number N of command points to transfer to the robot controller 110 is selected. In a representative example of a pick, move and place operation defined by a three-dimensional curve shape, it may be desired to send ten command points to the robot controller 110 (whereas the planned path included a much larger number of waypoints, such as 30). Thus, in this example, the value of N is ten. The ten path points, $P[1], \ldots, P[10]$, are then computed by plugging in the appropriate values of the arc length parameter a from $P[1]$ ($a=0$) to $P[10]$ ($a=1$).

The path function fitting module 440 then provides the sparse sequence of command points $P[i]$ to the tool path motion interface module 450, which transfers the sparse command points to the top-level program execution module 340 on the robot controller 110 as discussed earlier. The robot controller 110 then uses its inherent capabilities including joint kinematics calculations and interpolation point calculation to compute smooth and efficient robot motions to perform the task. Knowledge of the robot controller's spline function fitting and interpolation point calculation algorithms can help ensure that the spline calculation in the path function fitting module 440 produces the desired results when the command points $P[i]$ are converted to robot motion commands by the controller 110.

Throughout the preceding discussion, various computers and controllers are described and implied. It is to be understood that the software applications and modules of these computer and controllers are executed on one or more computing devices having a processor and a memory module. In particular, this includes a processor in the robot controller 110 and the computer 120 of FIGS. 1 and 3 discussed above. Specifically, the processor in the computer 120 is configured to perform the computations of the motion planning module 320—including path planning and selection using a combination of sampling-based and optimization-based methods, and path function fitting. The processor in the robot controller 110 is configured to perform the program execution, motion management and planning, interpolation/filtering and servo motor control functions discussed earlier.

As outlined above, the disclosed techniques for a robot motion planning using a combination of optimization and sampling methods and path function fitting improve the speed and quality of robot path planning. The combination of optimization and sampling path planning methods provide the best quality path that can be computed in the allotted cycle time, and the path function fitting allows the robot controller to use its inherent capability for computing robot joint motions and interpolation points which provide smooth and fast execution of the robot tool motion.

While a number of exemplary aspects and embodiments of the robot motion planning technique have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for motion planning of an industrial robot, said method comprising:
   providing input information for planning a path of a tool on the robot, including a start point and a goal point for the path of the tool, and data defining obstacles to be avoided;
   computing and selecting a planned path comprising a set of waypoints based on the input information, by a computer having a processor and memory, including computing and selecting the planned path using either a parallel combination or a serial combination of a sampling-based collision-free motion planning method and an optimization-based collision-free motion planning method, where the optimization-based collision-free motion planning method determines the waypoints in the planned path by iteratively computing the waypoints from the start point to the goal point using an objective function for path quality and a constraint function for collision avoidance;
   computing a reduced set of command points representing the planned path, where a number of waypoints in the planned path is greater than a number of command points, where computing the reduced set of command points includes computing a spline curve function to fit the waypoints of the planned path, where an arc length parameter having a value in a range of zero to one defines a position on the spline curve function, and evaluating the spline curve function at each of the command points based on the arc length parameter and the number of command points; and
   computing robot joint motions to cause the tool on the robot to follow the planned path based on the command points, by a robot controller in communication with the computer.

2. The method according to claim 1 wherein providing input information includes providing camera images or sensor data depicting a workspace, and determining the start point and the goal point from the camera images or sensor data, where the start point and the goal point each include a three-dimensional (3D) location and an orientation.

3. The method according to claim 2 wherein the data defining the obstacles is either determined from the camera images or sensor data, or is provided as 3D model data from another source.

4. The method according to claim 1 wherein the sampling-based collision-free motion planning method determines the waypoints in the planned path by building a random tree structure of proposed waypoints and selecting waypoints which are collision-free and which ultimately connect the start point to the goal point.

5. The method according to claim 1 wherein computing and selecting a planned path includes using a serial combination of the sampling-based and optimization-based methods, where the sampling-based method computes a preliminary collision-free path based on the input information, and the optimization-based method computes the planned path based on the input information and using the preliminary collision-free path as an initial reference path while ensuring that the planned path is collision-free.

6. The method according to claim 5 wherein, on subsequent robot tasks where a process reset has not occurred, an initial reference generation process is used instead of the sampling-based method to provide the initial reference path.

7. The method according to claim 6 wherein the initial reference generation process includes selecting a candidate path from a repository of previously computed paths, and transposing and scaling the candidate path to generate the initial reference path with first and last points matching the start point and the goal point, respectively.

8. The method according to claim 1 wherein computing and selecting a planned path includes using a parallel combination of the sampling-based and optimization-based methods, where the sampling-based method and the optimization-based method each compute a proposed collision-free path based on the input information, and when both the sampling-based method and the optimization-based method provide a proposed collision-free path, the planned path is selected as the proposed collision-free path having a higher quality, where quality is determined based on at least path length and path smoothness.

9. The method according to claim 8 wherein, when only one of the sampling-based method or the optimization-based method provides a proposed collision-free path upon reaching a wait time threshold, the proposed collision-free path which is provided is designated as the planned path unless the quality of the proposed collision-free path is below a predefined quality metric value.

10. The method according to claim 1 wherein computing robot joint motions includes selecting a type of inverse kinematics calculation, performing the inverse kinematics calculation, and computing interpolation points between the command points.

11. The method according to claim 10 further comprising defining robot tool operation commands associated with the interpolation points, and providing joint motion commands and the tool operation commands to the robot.

12. A method for motion planning of an industrial robot, said method comprising:
 computing and selecting a planned path comprising a set of waypoints based on input information including a start point and a goal point for the planned path and data defining obstacles to be avoided, by a computer having a processor and memory, including computing and selecting the planned path using either a parallel combination or a serial combination of a sampling-based collision-free motion planning method and an optimization-based collision-free motion planning method, where the optimization-based collision-free motion planning method determines the waypoints in the planned path by iteratively computing the waypoints from the start point to the goal point using an objective function for path quality and a constraint function for collision avoidance;
 computing a reduced set of command points representing the planned path, by the computer, where a number of waypoints in the planned path is greater than a number of command points, where computing the reduced set of command points includes computing a spline curve function to fit the waypoints of the planned path, where an arc length parameter having a value in a range of zero to one defines a position on the spline curve function, and evaluating the spline curve function at each of the command points based on the arc length parameter and the number of command points;
 transferring the reduced set of command points to a robot controller; and
 computing robot joint motions to cause a tool on the robot to follow the planned path, by the robot controller, based on the command points.

13. A path planning system for an industrial robot, said system comprising:
 means for providing input information depicting a workspace, including a start point and a goal point for a path of a tool, and data defining obstacles to be avoided;
 a computer in communication with the means for providing input information, said computer having a processor and memory configured for computing and selecting a planned path comprising a set of waypoints based on the input information, including using a combination of a sampling-based collision-free motion planning method and an optimization-based collision-free motion planning method, where the optimization-based collision-free motion planning method determines the waypoints in the planned path by iteratively computing the waypoints from the start point to the goal point using an objective function for path quality and a constraint function for collision avoidance, and computing a reduced set of command points representing the planned path, where a number of waypoints in the planned path is greater than a number of command points, where computing a reduced set of command points includes computing a spline curve function to fit the waypoints of the planned path, where an arc length parameter having a value in a range of zero to one defines a position on the spline curve function, and evaluating the spline function at each of the command points based on the arc length parameter and the number of command points; and
 a robot controller in communication with the computer and the robot, said controller being configured for computing robot joint motions to cause the tool on the robot to follow the planned path based on the reduced set of command points received from the computer.

14. The system according to claim 13 wherein the means for providing input information includes a camera providing camera images or a sensor providing sensor data depicting the workspace, and determines the start point and the goal point from the camera images or sensor data, and where the data defining the obstacles is either determined from the camera images or sensor data or is provided as 3D model data from another source.

15. The system according to claim 13 wherein computing and selecting a planned path includes using a serial combination of the sampling-based and optimization-based methods, where the sampling-based method computes a preliminary collision-free path based on the input information, and the optimization-based method computes the planned path based on the input information and using the preliminary collision-free path as an initial reference path while ensuring that the planned path is collision-free.

16. The system according to claim 15 wherein, on subsequent robot tasks where a process reset has not occurred, an initial reference generation process is used instead of the sampling-based method to provide the initial reference path, where the initial reference generation process includes selecting a candidate path from a repository of previously computed paths, and transposing and scaling the candidate path to generate the initial reference path with first and last points matching the start point and the goal point, respectively.

17. The system according to claim 13 wherein computing and selecting a planned path includes using a parallel combination of the sampling-based and optimization-based methods, where the sampling-based method and the optimization-based method each compute a proposed collision-free path based on the input information, and when both the sampling-based method and the optimization-based method provide a proposed collision-free path, the planned path is selected as the proposed collision-free path having a higher quality, where quality is determined based on at least path length and path smoothness.

18. The system according to claim 17 wherein, when only one of the sampling-based method or the optimization-based method provides a proposed collision-free path upon reaching a wait time threshold, the proposed collision-free path is designated as the planned path unless the quality of the proposed collision-free path is below a predefined quality metric value.

19. The system according to claim 13 wherein computing robot joint motions by the robot controller includes selecting a type of inverse kinematics calculation, performing the inverse kinematics calculation, and computing interpolation points between the command points, and where the robot controller further defines robot tool operation commands associated with the interpolation points, and provides joint motion commands and the tool operation commands to the robot.

* * * * *